United States Patent
Ranieri et al.

(10) Patent No.: US 10,768,691 B2
(45) Date of Patent: Sep. 8, 2020

(54) WEARABLE MOTION TRACKING SYSTEM

(71) Applicant: Sensoryx AG, Zurich (CH)

(72) Inventors: Nicola Ranieri, Zurich (CH); Fabian Wenner, Embrach (CH); Rolf Adelsberger, Bergdietikon (CH); Hagen Seifert, Zurich (CH)

(73) Assignee: Sensoryx AG, Zurich (CH)

( * ) Notice: Subject to any disclaimer, the term of this patent is extended or adjusted under 35 U.S.C. 154(b) by 14 days.

(21) Appl. No.: 15/821,109

(22) Filed: Nov. 22, 2017

(65) Prior Publication Data

US 2018/0150131 A1 May 31, 2018

(30) Foreign Application Priority Data

Nov. 25, 2016 (EP) ..................... 16200754

(51) Int. Cl.
*G06F 3/01* (2006.01)
(52) U.S. Cl.
CPC .............. *G06F 3/011* (2013.01); *G06F 3/017* (2013.01)
(58) Field of Classification Search
CPC .................................. G06F 3/011; G06F 3/017
See application file for complete search history.

(56) References Cited

U.S. PATENT DOCUMENTS

| | | |
|---|---|---|
| 5,142,506 A | 8/1992 | Edwards |
| 7,628,074 B2 | 12/2009 | Vannucci et al. |
| 7,633,521 B2 | 12/2009 | Perlman et al. |
| 8,179,604 B1 * | 5/2012 | Prada Gomez .... G02B 27/0093 345/8 |
| 8,638,989 B2 | 1/2014 | Holz |
| 2002/0103610 A1 | 8/2002 | Bachmann et al. |
| 2003/0182077 A1 | 9/2003 | Emord |

(Continued)

FOREIGN PATENT DOCUMENTS

| | | |
|---|---|---|
| EP | 3 067 783 A1 | 9/2016 |
| WO | 99/053838 A1 | 10/1999 |

(Continued)

OTHER PUBLICATIONS

Bruderlin et al., "Motion Signal Processing", Proceedings of SIGGRAPH 95, pp. 105-108, 1995 (8 pages total).

(Continued)

*Primary Examiner* — Aneeta Yodichkas
(74) *Attorney, Agent, or Firm* — Sughrue Mion, PLLC

(57) ABSTRACT

A wearable motion tracking system (12) for capturing a relative position between a first body part (101) and a second body part (103) of said user (100) comprising a first measurement device (120a), a second measurement device (121a) and a computing device (150) that are configured such as to obtain by said computing device (150) a plurality of measurements between said first and second measurement devices (120a, 121a). Based on the plurality of measurements that comprises at least one distance measurement between said first and second measurement devices (120a, 121a) said computing device (150) is configured to compute, in three dimensions, a position of said second measurement device (121a) relative to said first measurement device (120a) for tracking the position of said second body part (103) relative to said first body part (101). The present invention further relates to a method of motion tracking.

23 Claims, 3 Drawing Sheets

(56) References Cited

U.S. PATENT DOCUMENTS

| | | |
|---|---|---|
| 2008/0261693 A1 | 10/2008 | Zalewski |
| 2008/0285805 A1 | 11/2008 | Luinge et al. |
| 2009/0054147 A1 | 2/2009 | Chiu et al. |
| 2009/0170601 A1 | 7/2009 | Chiu et al. |
| 2012/0046901 A1 | 2/2012 | Green et al. |
| 2015/0192402 A1 | 7/2015 | Ellsworth |
| 2015/0258431 A1 | 9/2015 | Stafford et al. |
| 2015/0258432 A1 | 9/2015 | Stafford et al. |
| 2016/0131761 A1 | 5/2016 | Yates et al. |
| 2016/0180595 A1 | 6/2016 | Grossinger et al. |
| 2016/0202770 A1 | 7/2016 | Hegde |
| 2016/0259404 A1 | 9/2016 | Woods |
| 2016/0295198 A1 | 10/2016 | Grossman et al. |
| 2017/0177091 A1* | 6/2017 | Shah ..................... G06F 3/017 |

FOREIGN PATENT DOCUMENTS

| | | |
|---|---|---|
| WO | 01/056007 A1 | 8/2001 |
| WO | 2014/114967 A1 | 7/2014 |
| WO | 2015/138448 A1 | 9/2015 |
| WO | 2015/139002 A1 | 9/2015 |
| WO | 2016/029183 A1 | 2/2016 |

OTHER PUBLICATIONS

Gleicher, "Retargetting Motion to New Characters", Proceedings of SIGGRAPH 98, pp. 33-42, 1998 (10 pages total).

Kovar et al., "Motion Graphs", Proceedings of SIGGRAPH 02, ACM Transactions on Graphics 21, 3, pp. 4763-482, 2002 (10 pages total).

Arikan et al., "Motion Synthesis from Annotations", University of California, Berkeley, pp. 402-408, 2003 (7 pages total).

Meyer et al., "A Survey of Position Trackers", Presence, vol. 1, No. 2, pp. 173-200, 1992 ( 28 pages total).

Hightower et al., "Location Systems for Ubiquitous Computing", IEEE Computer 34, 8, pp. 57-66, Aug. 2001 ( 10 pages total).

Welch et al., "Motion Tracking: No Silver Bullet, but a Respectable Arsenal", IEEE Computer Graphics and Applications, special issue on Tracking 22, 6, pp. 24-38, Dec. 2002 (16 pages total).

Damgrave et al., "The Drift of the Xsens Moven Motion Capturing Suit during Common Movement in a Working Environment", Proceedings of the 19th CIRP Design Conference Competitive Design, Mar. 30-31, 2009, pp. 338 (5 pages total).

Sun et al., "Adaptive Sensor Data Fusion in Motion Capture", Proceedings of the 13th International Conference on Information Fusion, Jul. 26-29, 2010 (9 pages total).

Zhou, H. et al., "Reducing Drifts in the Inertial Measurements of Wrist and Elbow Positions", IEEE Transactions on Instrumentation and Measurement, vol. 59, No. 3, Mar. 2010 (11 pages total).

Oculus Announces "Touch" VR Controller Delay to Second Half of 2016; Posted on Jan. 1, 2016 by verx in Science & patent news (one page total).

Prasuethsut, L., Manus VR image; Jun. 16, 2016 by Lily Praseuthsut (one page total).

Worrel, J., First VR gloves to enable touch feedback and weight sensations; by Jon Worrel, FudZilla, Jun. 17, 2018 (one page total).

Daniel Vlasic, et al., "Practical Motion Capture in Everyday Surroundings", ACM Transactions on Graphics, Jul. 2007, Article 35, pp. 35/1-35/10, vol. 26, No. 3.

European Search Report for 16200754.6 dated Jan. 24, 2017.

\* cited by examiner

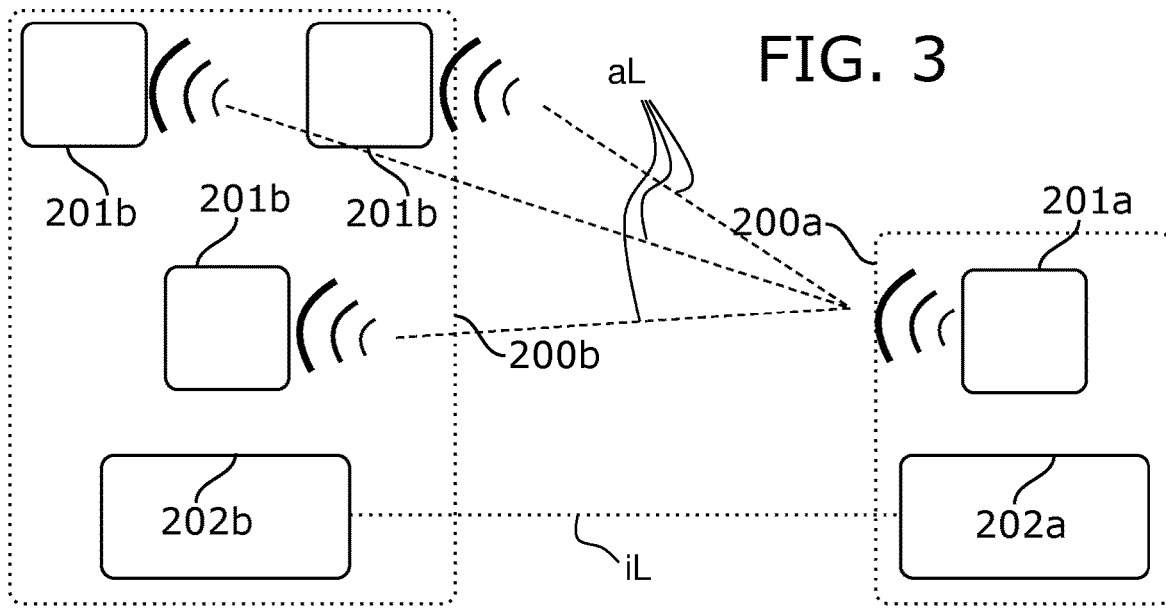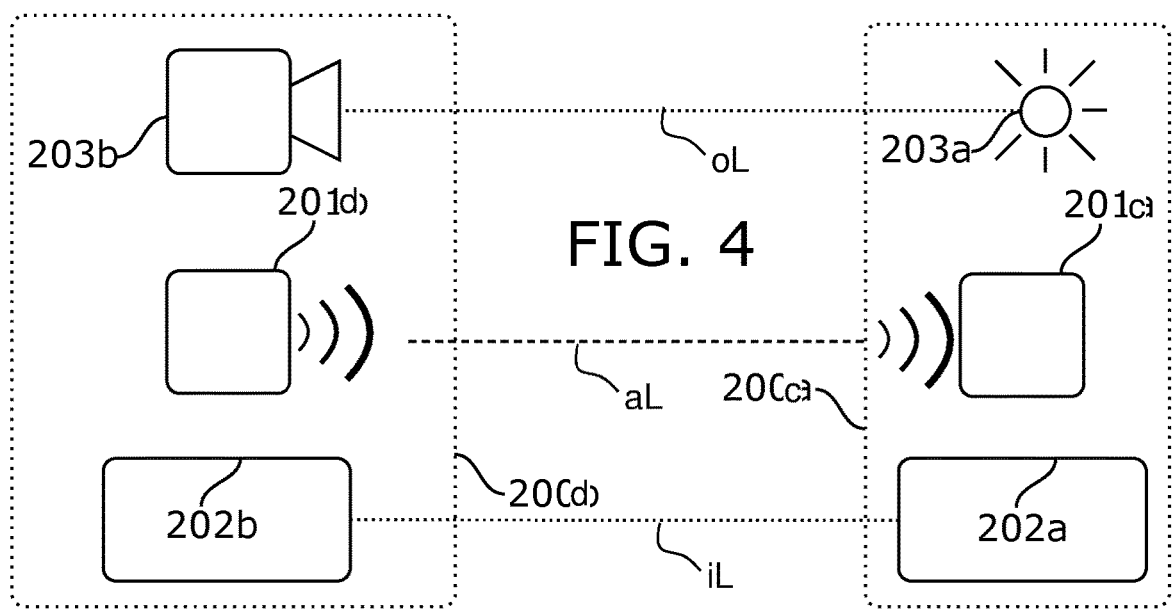

WEARABLE MOTION TRACKING SYSTEM

TECHNICAL FIELD

The present invention relates to a wearable motion tracking system for capturing a relative position between a first body part of a user, preferably a head or a torso, and a second body part of said user, preferably a upper limb, wrist or a hand. Moreover, the present invention relates to a method for capturing the relative position between the first and second body parts for tracking the position of the second body part relative to the first body part. The resulting data may be implemented, preferably in real-time (with low latency) into a virtual environment. The present invention may be used to establish a link from a human being into a virtual environment.

PRIOR ART

Tracking the human body motion is used in many different applications. The filming industry captures motions to render virtual characters in movies. In sports, capturing a specific motion can give feedback about the correctness of the same. In healthcare, motion data can provide information about the health state of a patient. Also, motion data can be used to interact with a virtual environment in a natural way.

There are a couple of systems aiming on motion capturing using external references. U.S. Pat. No. 7,633,521 uses a set of cameras placed in the environment of the user, capturing positions of retroreflectors attached to the user's limbs. This approach provides an accurate and fast way to compute positions of limbs by triangulation. However, the stationary, inflexible setup requires space, free line-of-sight and thus restricts the mobility of the user, lowering the appeal of such systems in home consumer products. Furthermore, the required calibration is clearly not suitable for non-professional applications.

US 2016 131761, US 2008 0261693 A1, US 2009 0054147 A1 and US 2009 0170601 A1 use a similar approach: They deploy an external reference device, consisting of an arrangement of sensors (e.g. image sensors and/or ultrasonic transducers), capable of tracking the sensor's counterparts attached to a hand held controller. In addition to the limitation of an external reference device mentioned above, these approaches further require the user to hold a device in his hands, dampening the immersion into the virtual environment and lowering the quality of the experience.

There are some systems trying to overcome the above-mentioned limitations by using a wearable sensor system. US 2008 0285805 A1, WO 1999 053838 A1, US 2002 0103610 A1, EP 3 067 783 A1, and U.S. Pat. No. 7,628,074 B2 deploy inertial measurement units (IMUs) on different limbs of the human body. Inertial data can be used to compute the orientation of the sensor in the world coordinate frame. Thus, having an IMU on most of the limbs, forward and inverse kinematics can be used to compute the pose. However, having the user to put on that many sensors on different body parts is not suitable for many home consumer products.

Acceleration data of these IMUs can be double integrated to compute the position in addition to the orientation, which would allow capturing the pose of only a subset of the limbs. However, as in each frame the position is computed based on the previous positions, errors are accumulated, resulting in a typical drift in the computed position common to these IMU based approaches. To correct for this drift, US 2008 0285805 A1 uses constraints implied by the human skeleton, while WO 1999 053838 A1 and U.S. Pat. No. 7,628,074 B2 deploy acoustic transducers, measuring distance between limbs (as described in U.S. Pat. No. 5,142,506 A), which gives additional constraints to correct the drift. However, still a large number of such constraints need to be satisfied, increasing the number of sensors to wear. Furthermore, sensor fusion is usually not stateless and thus subject to accumulation errors, cumbersome in the implementation and can introduce latency and visual artifacts, depending on the filters used.

The system of various sensors as described and detailed in US 2003 0182077 A1 is used to assess the user's environment as precisely as possible when a GPS signal is not available. That system is not suited or designed to determine or calculate the three dimensional position and/or orientation of the user's limbs relative to one another, but solely to estimate the position of the body as a whole.

Few systems focus on the pose of the hand, to be used as input device. WO 2016 029183 A1 tracks the fingers and orientation of the hand and recognize gestures used to interact with the virtual environment. They lack, however, the localization of the hand and thus restrict interaction to applications where the position of the hand does not need to be known.

Further devices are deployed by U.S. Pat. No. 8,638,989 and by US 2016 202770. A purely optical system (e.g. optical depth sensing as in US 2016 0295198 A1) captures the position, orientation and pose of the hand in front of the imaging device, usually attached to the head. They do not require an external reference and therefore the system may be wearable, in particular lightweight. The implementation can be achieved state-less, so that each position is computed in each frame not depending on the previous computation, making the approach more stable. However, pure optical systems require parameter tuning and large computational efforts to estimate the position and pose which increases the latency and lowers the immersion into the virtual environment.

With the increasing number of applications dealing with a virtual environment, there is a growing need for input devices, enabling the user to interact with a virtual reality in a natural and improved way. The most natural way is to interact in the same way as with the real environment, namely by using body parts such as the hands. Besides interaction, visualization of the upper limbs is important too, such that the user can see his arms and hands in the virtual environment, giving visual feedback about his actions and increasing the immersive experience.

None of the mentioned approaches provides a wearable, stable and non-intrusive way to track limbs at low latency without requiring the user to wear a large number of sensors or, the before-mentioned systems require significant knowledge about the environment and/or limit the immersion/capabilities.

SUMMARY OF THE INVENTION

Therefore, it is an object of the present invention to specify an improved wearable motion tracking system for capturing a relative position between a first body part of a user and a second body part of said user.

This object is achieved by a wearable motion tracking system according to claim 1. According thereto, a wearable motion tracking system for capturing a relative position between a first body part of a user and a second body part of said user is specified, said wearable motion tracking system comprising at least one first measurement device that is attachable to said first body part and at least one second measurement device that is attachable to said second body part. Moreover, the system includes a computing device that may communicate with at least one of the first and second measurement devices such as to retrieve measurement data of measurements between the first and second measurement devices, i.e. relating to measurements including one of the first and second measurement devices as reference point.

It is to be understood that said computing device may be a separate component of the system or it may be integrated into said first or said second measurement device.

The object is achieved in that said at least one first measurement device, said at least one second measurement device and said computing device are configured such as to obtain by said computing device a plurality of measurements between said first measurement device and said second measurement device, wherein said plurality of measurements between said first measurement device and said second measurement device comprises at least one distance measurement between said first measurement device and said second measurement device, and in that said computing device is configured to compute, in three dimensions, a position of said second measurement device relative to said first measurement device using said plurality of measurements for tracking the position of said second body part relative to said first body part.

In other words, the object is achieved in that said at least one first measurement device, said at least one second measurement device and said computing device are configured:

i) to obtain by the computing device at least one distance measurement between said first measurement device and said second measurement device; and ii) to obtain, by the computing device at least one further measurement between said same first measurement device and said same second measurement device; and wherein said computing device is configured to compute, in three dimensions, a position of the second measurement device relative to the first measurement device using said distance measurement and said further measurement, i.e. it computes a distance vector in three dimensions.

In the context of the present invention, the term "wearable system" is to be understood as a system that may be worn by human beings (or other users, see below) whilst acting, for example, in a virtual environment. The wearable motion tracking system is non-intrusive and barely noticeable to the user. It is easy to put on and mobile so that the user is not limited in his motion. Furthermore, it is advantageous if the update rate of the system is high, while reaction time and latency may be minimal to convince the user that his virtual replica and/or his virtual representation of his motion actually represent(s) him. Accordingly, excessive computation effort is a disadvantage.

In the context of the present invention, the term "motion tracking system" is to be understood as a device, a multi-component apparatus, that allows to track a three-dimensional distance vector connecting the first and second measurement devices, wherein said distance vector is, in some instances, a measure for a change in relative position between the first and second body parts to which, during operation, the first and second measurement devices, respectively, are attached to. The tracking data generated by the wearable motion tracking system may be, for example, integrated into a virtual reality.

In the context of the present invention, the term "first and second body parts" is to be understood as two parts of a body, preferably of a human body, which may move relative to one another. First body parts may be body parts such as a head or a torso or any other body part such as a limb, second body parts may be part of the limbs, in particular of the upper limbs or parts thereof such as finger (including thumb), hand, wrist, upper or lower arm, or elbow. Of course, also the lower limbs or parts thereof may be second body parts such as toe, foot, ankle or lower or upper leg. It is to be understood that the second body part may, however, also be any other body part such as the torso or the head. Accordingly, the first and second body parts are any two parts of the body that may move or change relative to one another. It is to be understood that the wearable motion tracking system may preferably be used by a human being while other objects that change their physical appearance may, however, also be understood as users.

In the context of the present invention, the term "measurement between the first and second measurement device" is to be understood as measurement in which the first measurement device is a reference and the position (and preferably orientation) of the second measurement device is measured relative to said reference.

The invention is therefore based on the realization that by deploying at least two measurement devices that are linked, preferably in a wireless manner, through a communication channel and integrated into a wearable tracking system such that one measurement device provides a reference frame in which the other device is positioned and localized through said communication link, a more effective system may be realized than, for example, the known implementations relying on purely optical systems that, under substantial computational effort, evaluate a visible environment, or the known implementations requiring a stationary setup, or the know systems relying on IMUs for position gathering whilst correcting the position afterwards with further measurements.

The tracking system according to invention deploys a state-less implementation, i.e. each position of the second measurement device relative to the first measurement device is computed in real-time and independently of the previous computation in the tracking chain.

In some embodiments, said plurality of measurements between said first measurement device and said second measurement device comprises at least one direction measurement between said first measurement device and said second measurement device. In these embodiments, the direction measurement results, in combination with the distance measurement, directly in the position in three dimensions of the second measurement device with respect to the first measurement device. So the present teaching already works with two sensors and two measurements between the first and the second measurement device. This is advantageous, as fewer beacons, less hardware and less computation are required in comparison to known approaches.

Moreover, the present invention does not require complex sensor fusion algorithms as extended Kalman filters or the like, to combine measurements from multiple sensors and sensor types. The measurements taken by the system according to invention (e.g. one distance measurement by e.g. an acoustic receiver/emitter pair and one direction measurement by e.g. an optical receiver/emitter pair) can be used to directly eliminate all degrees of freedom and compute directly the relative position between the first and second measurement device without requiring any other third or fourth sensor device. This results in less computation, less latency and more stability. To give an example: in order to estimate the hand position relative to the head, according to known approaches, one requires one sensor on the head, one on the hand and two more on the head or other body parts (which is cumbersome to wear) while according to some embodiments of the invention, only one measurement device on the head and one on the hand is needed.

According to the present invention, multiple measurements between two nodes, i.e. between two distinct and independently attachable measurement devices, are used. Instead of using inertial measurement unit (IMU) measurements, at least one additional measurement between the nodes, i.e. the measurement devices, is used. IMU measurements are not used for localization but for computing the orientation.

The motion tracking problem solved by the present invention can further be described in an abstract way as follows. Given a point in space with known orientation, the position of a second point relative to the first point needs to be found. Without loss of generality, the first point can be assumed to be located at the origin of a xyz coordinate system and front facing the positive Z-axis. This coordinate system is called body frame of the first point. To solve the described tracking problem, the x-, y- and z-coordinate of the second point expressed within this body frame of the first point is required. These coordinates do not need to be expressed within this format, but can be represented by other values.

In a further representation, two angles and a radius can describe the relative position of the two points in terms of spherical coordinates.

For cases where the second point lies always in front of the first point, its relative position can further be described by two coordinates on a virtual xy-plane at a z-value of one (describing the direction towards the second point) in combination with the distance between the two points. This representation is often used in computer vision, as the plane naturally describes the image plane of a camera sensor and the plane coordinates correspond to pixel coordinates.

Yet another representation is to choose three fixed points on the xy-plane located at the origin (z value equals 0) and describing the position of the second point by the three distances to the three fixed points. This would naturally represent three distance measurements made between the three fixed points representing the first point and the second point.

All representations can be converted from one to another. Example given, the three distance measurements made at three fixed points can be used to compute the xyz-coordinates by trilateration.

Thus, the representation of the relative position between the points shall not limit the present invention in its scope. Any combination of distance measurements, directional measurements or other measurements can be used to eliminate the degrees of freedom of the relative position, independent of their representation. Example given, a directional measurement can result in two angles of a spherical coordinate representation. The radius, being the third degree of freedom, can be eliminated by a distance measurement.

In some embodiments, said first measurement device comprises a first acoustic communication device and said second measurement device comprises a second acoustic communication device. The first and second communication devices are configured to establish an acoustic link between one another, for example, an ultra-sonic link. This link offers the option of an acoustic measurement between the first and second measurement devices. One of the first and second measurement devices may comprise an acoustic transmitter, the other an acoustic receiver. Accordingly, said plurality of measurements, on which the computation of the relative position of the second measurement device relative to the first measurement device is based, comprises at least one acoustic measurement between said first acoustic communication device and said second acoustic communication device. An acoustic link allows for a stable and reliable, low-cost and fast measurement.

In some embodiments, said acoustic link is used for determining the distance between the first and second measurement devices. Accordingly, the at least one distance measurement may be said at least one acoustic measurement.

In some embodiments, multiple acoustic receivers are arranged on an array or other known formation on the first device, making multiple acoustic measurements with an acoustic sender on the second device.

The relative delay of the received signal in between the acoustic receivers on the first device directly relates to the direction of the second device relative to the first device.

In specific, as the acoustic signal is emitted by a single sender, the receiver closest to the sender will receive the signal first.

The time delay until the second receiver records the signal is proportional to the angle between the sender and the first receiver, and the first and the second receiver. Multiple receivers increase accuracy and allow to measure angles in two dimension.

Accordingly, a directional measurement between the first and second device can be an acoustic measurement.

Acoustic directional measurements are also known as directional microphones or microphone array.

It is clear that the present invention is not limited by using an array of acoustic receivers, but can be implemented by any directional microphone.

In some embodiments, additionally or alternatively to the acoustic link, an optical link may be established between said first and second measurement devices. Therefore, said first measurement device comprises a first optical communication device and said second measurement device comprises a second optical communication device. Accordingly, the first and second communication devices are configured to establish an optical link between one another. Said plurality of measurements includes at least one optical measurement between said first optical communication device and said second optical communication device.

In some embodiments, one of said first and second optical communication devices comprises an image sensor as first or second optical communication device, while the other of said first and second optical communication devices comprises a trackable feature as second optical communication device, preferably a radiation source such as an light emitting diode (LED), e.g. an infrared LED, wherein, preferably, a size and/or colour and/or luminosity of the trackable feature is known to and used by the wearable motion tracking system to locate, in terms of a polar coordinate system, the angular coordinates of the second measurement device. It is clear that any other representation of the direction can be used, as discussed above. The trackable feature may also be an arrangement of features such as an array of LEDs or the like, which is particularly advantageous, if the size of the trackable feature is evaluated, for example, in a measurement of the relative distance between the image sensor and the trackable feature.

The radial coordinate may then be gained from the at least one distance measurement, which may be an acoustic, an optical or an ultra-wide band measurement performed by means of the accordingly featured first and second measurement devices. Through analysis of the relative size of the trackable feature, distance information may be obtained and used as optical distance measurement. Using, for example, the known camera parameters, the size (e.g. side length of the square with LED on its corners) of the projected feature can be used to compute the distance.

In some embodiments, said optical link may be used for determining the distance between the first and second measurement devices. Accordingly, the at least one distance measurement may be said at least one optical measurement.

In some embodiments, additionally or alternatively to the acoustic link and/or the optical link, an ultra-wide band link may be established between said first and second measurement devices. Therefore, said first measurement device comprises a first ultra-wide band communication device and said second measurement device comprises a second ultra-wide band communication device. Accordingly, the first and second communication devices are configured to establish an ultra-wide band link between one another. Said plurality of measurements includes at least one ultra-wide band measurement between said first ultra-wide band communication device and said second ultra-wide band communication device.

Similar to the directional acoustic measurement described above, an array of ultra wide band distance measurements can also be used to realize a directional measurement.

Instead of using the time delay between receivers, the relative phase shift can be used to determine the angle between sender and any two receivers.

Alternative links to the acoustic, optical and/or ultra-wide band link may be used.

In some embodiments, said first body part is a torso or a head of said user. Accordingly, the wearable motion tracking system may be a head-mounted and/or a torso-mounted system.

Preferably, said second body part is an upper limb and/or a wrist and/or hand of said user.

In some embodiments, said computing device is integrated, at least in part, into a reference unit, the reference unit being attachable to the first body part of the user and further comprising the at least one first measurement device.

In some embodiments, said computing device is integrated, at least in part, into a tracked unit, the tracked unit being attachable to the second body part of the user and further comprising the at least one second measurement device.

Accordingly, the computing device may be integrated separately, or with the first measurement device into the reference unit or with the second measurement device into the tracked unit or components of the computing device may be integrated with both first and second measurement devices.

In some embodiments, one first measurement device or one reference unit may be attached to the head, for example in a head-mounted display device, another to the torso or other body parts, while one or more second measurement devices or tracking units may be attached to the limbs, preferably to the upper limbs and/or to the hand(s) and/or wrist(s) or other body parts.

In some preferred embodiments, said plurality of measurements consists of three distance measurements or more of said distance measurements. Preferably, three acoustic distance measurements may be performed by means of three receivers and at least one, for example three, transmitters or three transmitters and at least one, for example three, receivers, wherein the receiver(s) are integrated into one of the first and second measurement devices while the transmitter(s) are integrated to the other of the first and second measurement devices. Accordingly, a common transmitter or a common receiver may be deployed communication with three cooperating sensor parts. Here, with the knowledge of the relative position of the transmitters (or receivers) on the same device, three or more distance measurements can be used to triangulate the position of the second measurement device in three dimensional space.

In some embodiments, said first measurement device and/or said second measurement device comprise one or more further measurement devices for determining and tracking, at least partially, an orientation of the second measurement device relative to the first measurement device or an absolute orientation of the second measurement device. In some preferred embodiments, said one or more further measurement devices are IMUs.

In some embodiments, these additional sensors, that are capable of determining their orientation in one to three orthogonal axes (e.g. IMUs), can be deployed on, for example, the hand and/or finger segments, to compute the pose and gesture of hand and/or finger segments with forward kinematics, based on the position of the upper limb or hand computed by the present invention. Accordingly, the sensors may be integrated into a glove. Similarly, the same type of sensor can be attached, for example, to the lower arm and or upper arm, to compute the pose of the upper limbs by forward and or inverse kinematics. In the very same manner, the pose and orientation of the head or other limbs can be computed, when one of the two devices of the present invention is attached to the torso and such an orientation device is attached to the head.

The pose and gesture of the upper limb, hand, and/wrist may, for example, be used to render a virtual avatar of the user and to interact with a virtual environment exposed to the user by e.g. virtual reality glasses, augmented reality glasses or other head mounted displays.

It is a further object of the present invention to specify an improved method for tracking a relative position between a first body part of a user and a second body part of said user.

This further object is achieved by the method according to claim 12. According thereto, a method for tracking a relative position between a first body part of a user and a second body part of said user, said method comprising:

using at least one first measurement device attachable said first body part, at least one second measurement device attachable to said second body part and a computing device, and executing an application on said computing device in order i) to perform a plurality of first measurements between said first measurement device and said second measurement device, wherein said plurality of first measurements between said first measurement device and said second measurement device comprises at least one distance measurement between said first measurement device and said second measurement device; and ii) to compute, in three dimensions, a first position of said second measurement device relative to said first measurement device using said plurality of first measurements;

iii) to perform one or more pluralities of subsequent measurements between said first measurement device and said second measurement device, wherein said plurality of first measurements between said first measurement device and said second measurement device comprises at least one distance measurement between said first measurement device and said second measurement device; and iv) to compute, in three dimensions, one or more subsequent positions of said second measurement device relative to said first measurement device using one or more pluralities of further measurements for tracking said position of said second body part relative to said first body part.

The position and the subsequent positions then form a track that may be implemented into the virtual environment.

In some embodiments of the method according to invention, said first body part is a torso and/or a head of said user.

In some embodiments of the method according to invention, said second body part is an upper limb and/or a hand of said user.

In some embodiments of the method according to invention, said plurality of first measurements and/or said one or more pluralities of subsequent measurements comprise, as said at least one distance measurement, at least one measurement selected from the group consisting of an acoustic measurement, an optical measurement and an ultra-wide band measurement.

In some embodiments of the method according to invention, said tracked position of said second body part relative to said first body part is used in a virtual environment.

Accordingly, the present invention discloses a wearable sensor or motion tracking system, capable to compute the position of body parts such as an upper limb, wrist and/or hand relative to another body part such as the torso and/or the head in real time whilst the determination of the position relies on a plurality of measurements comprising at least one distance measurement.

In a preferred embodiment, a first measurement device is attached to either torso or the head. One second measurement device is attached to the limb, wrist or hand which needs to be tracked. The two measurement devices communicate with one another through a link and the exchanged information is used to compute the three dimensional position of one measurement device, preferably expressed in coordinates within the body frame of the other measurement device.

The localization of the tracked limb can be achieved in different ways. The present invention deploys at least one distance measurement device, where the sender of the distance measurement device is part of the device attached to one body part while the receiver is part of the device attached to the other body part or vice versa.

As detailed herein, in one preferred approach, the present invention deploys at least two more distance measurement sensors integrated on the same measurement device. They can optionally share a common sender or a common receiver. Knowing the relative position of the transmitters on the same device, three or more distance measurements can be used to triangulate the position of the tracked device in three dimensions.

As detailed herein, in another preferred approach, an image sensor is attached to either of the two measurement devices and a trackable feature is attached to the other device. The tracked image coordinates of the feature can be used to compute the relative angle between the image sensor and the feature and define, together with the distance measurement, the relative position between the two devices.

It is to be understood that the features of the different embodiments outlined above may be freely combined with one another.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

FIG. 3 shows first embodiments of the first and second measurement devices according to FIG. 1 or FIG. 2 in more detail;

FIG. 4 shows second embodiments of the first and second measurement devices according to FIG. 1 or FIG. 2 in more detail;

DESCRIPTION OF PREFERRED EMBODIMENTS

The following description and examples further illustrate the present invention, but should not be interpreted as limiting its scope. Preferred embodiments are described with reference to FIGS. 1 to 6. The figures show schematic illustrations of preferred embodiments. The same reference signs in the figures designate the same components or components with the same technical effect.

Figure 1:
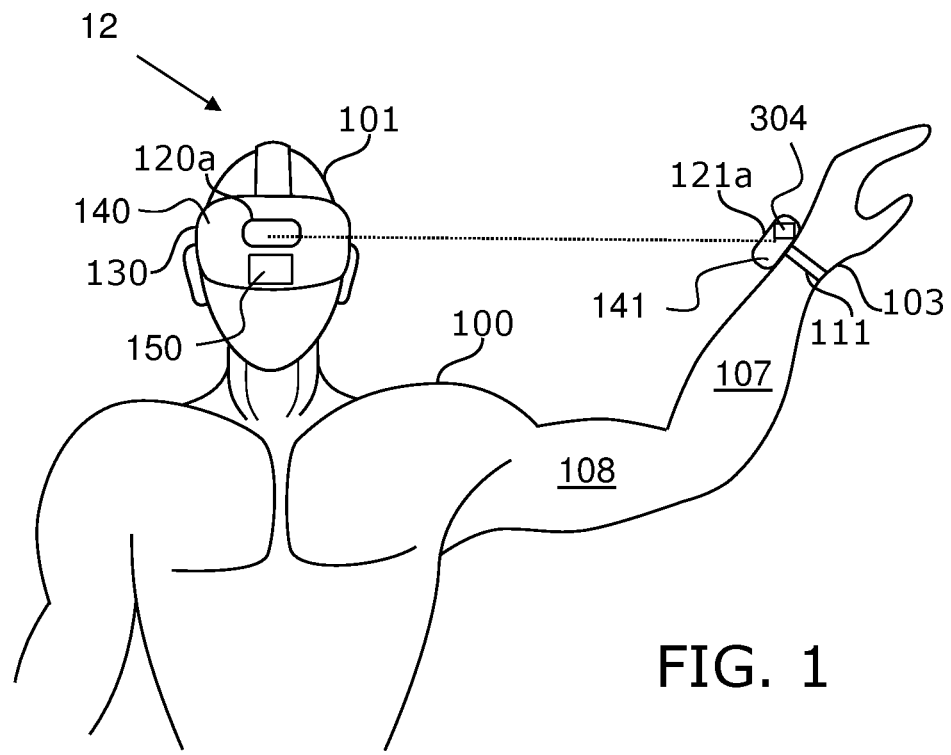
FIG. 1 shows a first embodiment of a wearable motion tracking system according to the present invention with first and second measuring devices.

FIG. 1 shows a first embodiment of a wearable motion tracking system 12 according to invention. Said wearable motion tracking system 12 comprises a first measurement device 120*a* (the tracking device) that is attached to, e.g. integrated into, a head-mounted display 130 on a first body part of a user 100, the first body part being a head 101 of the user 100. The head-mounted display 130 is, in the first embodiment, a reference unit that sets the reference frame in which the tracking is done. A second measurement device 121*a* (the tracked device) is attached to a wristband 111 disposed on a second body part, the second body part being a wrist 103 of the user 100. Instead of the wristband 111 other typical attachment means such as a gauntlet glove or tape or integration into clothing may be used. The first measurement device 120*a* and the second measurement device 121*a* are coupled to one another via a communication link for exchange of information, wherein said information is then used as a basis to compute, in three dimensions, the position of the second measurement device 121*a* relative to the first measurement device 120*a*, thereby determining the position of the wrist 103 relative to the head 101. The information exchange comprises a plurality of measurements, including at least one measurement of a relative distance between the first and second measurement devices 120*a*, 121*a*, wherein, by using said plurality of measurements including the distance measurement as input to a computing device 150, the distance vector is computed in three dimensions. The computing device 150 is preferably integrated into the head-mounted component of the system 12 and connected such as to receive said input and such as to provide the computation result for further use, for example, for implementation into a virtual reality displayed on the head-mounted display 130. The computing device 150 can also be disposed on the hand or even distributed, e.g. parts are computed in one of the first and second measurement devices 120*a*, 121*a* or 120*b*, 121*b*, other parts in the other one of the first and second measurement devices 120*a*, 121a or 120b, 121b). E.g. one computing device part may be located on the respective measurement device with the image sensor (e.g. a camera) and determines the polar coordinates. Another part of the computing device may be located at the acoustic receiver on the other body part and computes the radial coordinate. Each computing device may send its data to a host where it is combined and implemented, e.g., into the virtual reality.

Figure 2:
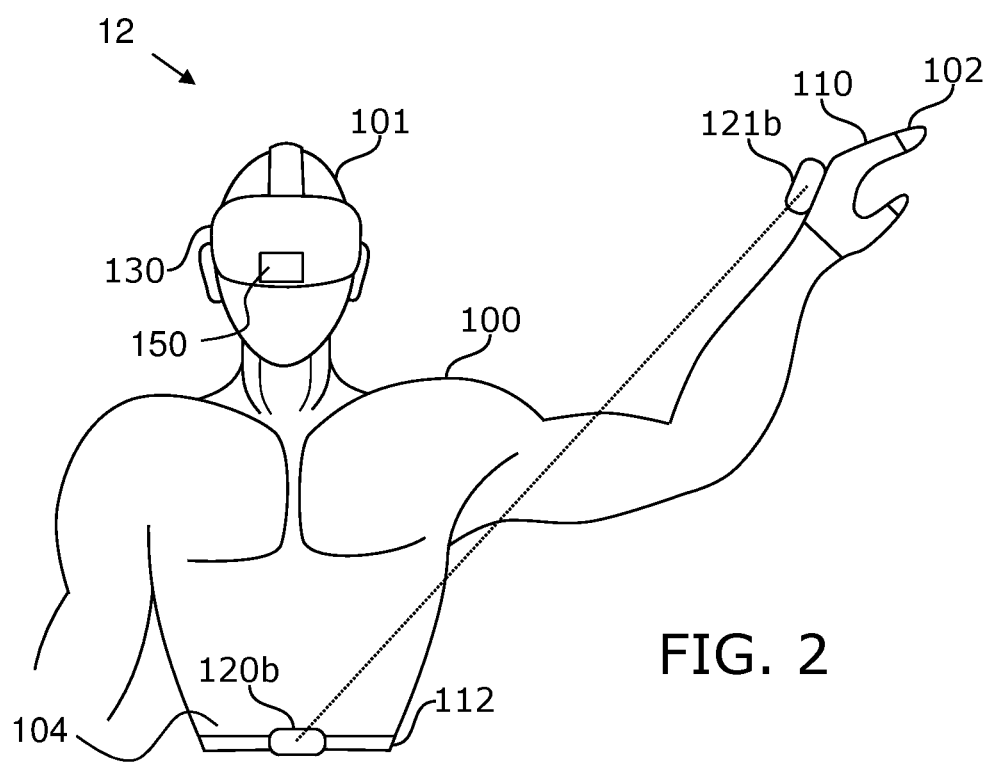
FIG. 2 shows a first embodiment of a wearable motion tracking system according to the present invention with first and second measuring devices.

In some embodiments, the computing device 150 may be integrated separately; in some embodiment, the computing device 150 may be integrated with the first measurement device 120a, 120b into the reference unit 140 or with the second measurement device 121a, 121b into the tracked unit 141. In some embodiments, components of the computing device 150 may be integrated with both first and second measurement devices 120a, 120b, 121a, 121b or, optionally, also into further components of the system 12. FIG. 2 shows a second embodiment of the wearable motion tracking system 12 according to invention. The system 12 comprises the first measurement device 120b that is attached to a torso 104 of the user 100 with a belt 112 or similar attachment means. According to the second embodiment, the torso 104 is the first body part. The second device 121b is attached to the hand 102 with a glove 110 or similar. According to the second embodiment, the second body part is the hand 102. The first and second measurement devices 120b, 121b are coupled through the communication link through which the plurality of measurement between the two devices 120b, 121b are performed. Here, the computing system 12 is preferably integrated into the torso-mounted or head-mounted component of the system 12 and configured to compute, on the basis of said plurality of measurements, the position, in three dimensions, of the second measurement device 121b relative to the first measurement device 120b attached to the torso 104. Accordingly, in the second embodiment, the reference frame for tracking the second measurement device 121b is that of the torso 104 and the computing device 150 may be provided separate from the first and second measurement device 120b, 121b, in the head-mounted display 130.

In both embodiments, the position of the second body part 103 and 102, respectively, i.e. the position of the second measurement device 121a and 121b, respectively, can then be computed, in three dimensional space, by the computing device 150 and may be rendered in the virtual environment shown on the head-mounted display 130 or used to interact with it.

It is generally to be understood, that several second measurement devices may simultaneously be tracked in the reference frame of the first measurement device.

FIG. 3 shows an embodiment on how to implement the first and second measurement device pairs 120a and 121a in FIG. 1 or 120b and 121b in FIG. 2.

A first acoustic communication device 200a deploys an acoustic emitter 201a and a first instantaneous communication device 202a, e.g. a radio frequency module.

A second acoustic communication device 200b deploys at least three acoustic receivers 201b with known relative position and a second instantaneous communication device 202b.

The first acoustic communication device 200a with the acoustic emitter 201a and second acoustic communication device 200b with the acoustic receiver 201b may establish an acoustic link aL, more precisely: three acoustic links, between one another.

The first instantaneous communication device 202a and the second instantaneous communication device 202b may establish an instantaneous link iL between one another.

In operation, the first instantaneous communication device 202a announces an acoustic pulse of the acoustic emitter 201a and triggers the acoustic pulse. The second instantaneous communication device 202b receives the announcement, starts the timer and starts listening on the acoustic receivers 201b. The time when the pulse is sent by the emitter 201a and the three individual times when the pulse is detected in the receivers 201b can be used to triangulate, in three dimensions, the relative position between the first and second measurement devices 120a, 121a and 120b, 121b, respectively.

The first acoustic communication device 200a may be integrated into one of the first and second measurement devices 120a, 121a and 120b, 121b, respectively, the second acoustic communication device 200b may be integrated into the other of the first and second measurement devices 120a, 121a and 120b, 121b, respectively.

FIG. 4 shows a further embodiment on how to implement first and second measurement device pairs 120a and 121a in FIG. 1 or 120b and 121b in FIG. 2.

A first opto-acoustic communication device 200c deploys the acoustic receiver 201c, the first instantaneous communication device 202a and an infrared light emitting diode 203a.

A second opto-acoustic communication device 200d deploys the acoustic emitter 201d, the second instantaneous communication device 202b and an infrared imaging device 203b.

The infrared light emitting diode 203a as a first optical communication device and the infrared imaging device 203b as the second optical communication device may establish an optical link oL between one another.

In operation, the acoustic emitter 201c and receiver 201d are used together with the first and second instantaneous communication devices 202a and 202b to measure the distance between the first and second measurement devices 120a, 121a and 120b, 121b, respectively, by a time-of-flight measurement of the acoustic signal as described above. The imaging device 203b and the infrared LED 203a are used to compute the angular coordinates between the first and second measurement devices 120a, 121a and 120b, 121b, respectively. The angular coordinates and the distance determine the position between of the second measurement device 121a and 121b, respectively, relative to the first measurement device 120a and 120b, respectively.

The first opto-acoustic communication device 200c may be integrated into one of the first and second measurement devices 120a, 121a and 120b, 121b, respectively, the second opto-acoustic communication device 200d may be integrated into the other of the first and second measurement devices 120a, 121a and 120b, 121b, respectively.

Figure 5:
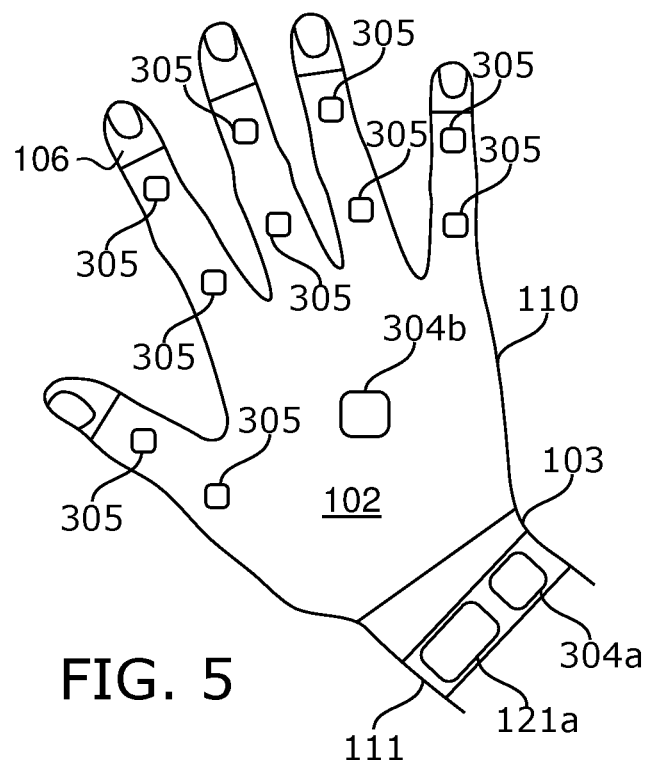
FIG. 5 shows a further embodiment tracking the full pose of an upper limb and hand.

FIG. 5 shows an embodiment how to get a full pose of an upper limb 107, 108 (see FIG. 1) and hand 102. As shown in FIG. 1, the first measurement device 121a is attached to the wrist 103 of the user 100 using the wristband 111 or similar. In addition, a further measurement device 304a being capable of determining its orientation (e.g. an IMU) is attached to the wristband 111 too. The position determined by means of the second measurement device 121a and the orientation determined by means of 304a are used to position the second body part, here a lower arm 107 (see FIG. 1), in three dimensional space.

Inverse kinematics may be used to find position and orientation of an upper arm 108 (see FIG. 2). A further device 304b capable of determining its orientation is attached to the hand, and similar devices 305 are attached to the segments of the fingers 106. Based on the position and orientation delivered by 121a and 304a, forward kinematics can be used on the orientations delivered by the devices 304b and 305 to compute the pose and gesture of the hand 102 and the fingers 106.

Figure 6:
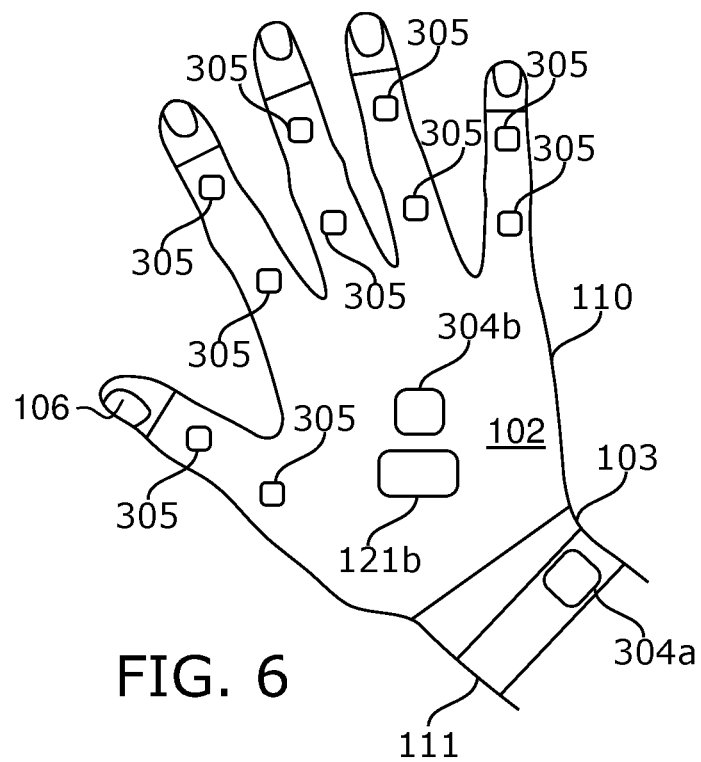
FIG. 6 shows a still further embodiment tracking the full pose of an upper limb and hand.

FIG. 6 shows a further embodiment how to get the full pose of the upper limb 107, 108 (see FIG. 1) and hand 102. As shown in FIG. 2, the device 121b is attached to a user's hand 102 using a glove 110 or similar. In addition, a further measurement device 304b being capable of determining its orientation (e.g. an IMU) is attached to 110 too. The position delivered by 121a and the orientation of 304a are used to position the hand 102 in space. Further devices 305 capable of determining their orientation (e.g. IMUs) are attached to segments of the finger 106. Forward kinematics may be used on the orientations delivered by the devices 305 to compute the pose and gesture of the hand 102.

In this configuration, an optional wristband 111 and attached device 304a able to compute its orientation can be used in combination with inverse kinematics to compute the pose of the lower and upper arms 107, 108.

Accordingly, the present invention deploys at least two physically separated measurement devices 120a, 121a and 120b, 121b, respectively, i.e. individual units, capable to communicate with each other. One of them, the first measurement device 120a and 120b, respectively, acts as reference device that is attached to either torso 104 (e.g. to the hip with a belt or to the chest as depicted in FIG. 2) or the head 101 (e.g. to the forehead or to a head-mounted display 130 worn by the user as shown in FIG. 1). Other body parts may, however, be chosen as first body parts. At least one further device, the second measurement device 121a and 121b, respectively, is attached to an upper limb, more precisely the wrist 103 (as illustrated in FIG. 1) or hand 102 (as seen in FIG. 2) by e.g. a wristband 111 or included into a glove 110 and its position is tracked relative to the position of the reference device 120a and 120b, respectively. Optionally, further second devices 121a, 121b and/or further measurement devices 304, 304b (such as IMUs) may be attached to the same or further body parts and tracked on the same or other limbs, e.g. on the other hand or the other wrist.

Depending on the application, the virtual environment is exposed to the user 100 as seen from the perspective of the user 100. In this scenario, the reference device (i.e. the first measurement device 120a, 120b) typically would be mounted to the head 101 of the user 100, as the body frame of the head 101 naturally corresponds to the virtual camera in the head-mounted display 130 and used to render the virtual environment.

In applications where virtual content is exposed in third person view, the reference device 120b may be put onto the torso 104. However, if the reference device 120b is attached to the torso 104, a device 304 capable of determining its orientation (e.g. an IMU) can be attached to the head 101, and the orientation can be used to translate the tracked position from the reference body frame of the torso 104 to the body frame of the head 101. Head-mounted displays typically already contain such orientation determining devices 304 and thus, in this specific case, no additional sensor would be required.

If the reference device 120a is attached to the head 101, an orientation capable device can be attached to the torso 104 to achieve similar results the other way around.

The tracked device, i.e. the second device 121a, 121b, respectively, of the present invention can further comprise such an orientation capable device 304, such that not only the position, but also orientation of the limb in one or more, preferably all three axes is known.

If further such orientation capable devices are attached to neighboring limbs, forward kinematics can be used to determine their position and orientation. For example, if the trackable device of our invention is attached to the wrist and orientation capable devices 304, e.g. IMUs, are attached to wrist, hand and finger segments (as illustrated in FIG. 5), forward kinematics may be used to compute the full pose and gesture of the hand 102, based on the position and orientation of the wrist 103.

Furthermore, inverse kinematics can be used to compute the pose and orientation of the upper arm 108, and thus the pose of the full arm 107, 108 and hand 102 is known.

Since the wrist device 121a and sensors 304, 304b, 305 on the hand 102 can all be integrated into a glove 110, a minimal set of items need to be worn by the user 100 and still the complete upper body motion can be tracked.

Similarly, said trackable device, i.e. the second measurement device 121b, can be attached to the hand 102 instead of the wrist 103, as illustrated in FIG. 6, and the same results can be achieved.

It is obvious that all combinations of reference device 120a, 120b being attached to torso 104 and/or head 101 and trackable device 121a, 121b being attached to upper limb 107,108 and/or hand 102 work equally well, even though only two cases are illustrated in FIG. 1 and FIG. 2.

The localization of the limb can be achieved in different ways. In one embodiment of the present invention, one or more acoustic emitter and an instantaneous communication device (e.g. a radio frequency module) are deployed in a first measurement device attached to a first body part and one or more acoustic receiver and another instantaneous communication device are deployed in a second measurement device attached to a second body part. The role of one acting as reference device and the other acting as tracked device is obviously interchangeable.

For each emitter in the system, an acoustic pulse is announced by the communication device on the same device and the pulse is triggered immediately afterwards. When the communication device on the device with an acoustic receiver receives the announcement, a timer is started measuring the time until the acoustic receiver detects the incoming pulse. The time of flight together with the known velocity of the acoustic signal is used to compute the distance between the two devices. It is clear that other devices capable of computing the distance (e.g. ultra-wide bandwidth or visual signals) can replace the acoustic device described in this embodiment.

At least three acoustic emitters pulsed one after each other in combination with at least one acoustic receiver, or at least one acoustic emitter and three acoustic receivers provide three different distance measurements. Knowing the relative position of at least three transmitters rigidly attached to one device provides together with the distance measurements enough information to compute the relative position between the devices by means of triangulation. The case of one emitter being shared by three receivers is illustrated in FIG. 3. Obviously, arbitrary combinations of emitters and receivers can be deployed on one or the other device.

In another embodiment, a distance measurement unit is complemented by another unit, capable of determining the angles defining the relative direction between the reference device and the tracked device expressed in e.g. spherical coordinates. An example for such a unit would be an image sensor attached to either the reference device or the tracked device and a trackable feature as e.g. an LED attached to the other device. The image sensor is capable to track the image coordinates of the projected image of the LED, which defines the two angles between the vector from image sensor center to the LED and the image sensor normal. The so defined direction from image sensor to LED together with the distance provided by the distance measurement unit define the relative position between the two devices.

It is to be understood that the present invention protects not only trackable features as e.g. LED and image sensors working in the visible spectra, but any other wave length as well (e.g. infrared). Furthermore, instead of using a single LED, an arrangement of LEDs or any other trackable feature can be used, further increasing stability of the approach.

If the feature pattern is known, computer vision approaches can be used to compute the distance by analyzing e.g. the size of the feature in image space. This leads to a further approach, where the feature size is used as distance measurement and the feature location as further measurement, providing enough information to compute the relative position between the devices.

Alternatively, the optical distance measurement can be accompanied by other distance measurements.

The subject-matter of the following claims is not necessarily limited to the specific features described above. The above examples and embodiments are possible implementations of the claims and other features are intended to be within the scope of the claims.

LIST OF REFERENCE SIGNS

| | | | |
|---|---|---|---|
| 100 | user | 200b | second acoustic communication device |
| 101 | first body part, head of 100 | 200c | first opto-acoustic communication device |
| 102 | second body part, hand of 100 | 200d | second opto-acoustic communication device |
| 103 | second body part, wrist of 100 | 201a, d | acoustic emitter/transmitter |
| 104 | first body part, torso | 201b, c | acoustic receiver |
| 106 | finger (incl. thumb) | 202a | first instantaneous communication device |
| 107 | lower arm | 202b | second instantaneous communication device |
| 108 | upper arm | | |
| 110 | glove | 203a | radiation device, infrared LED |
| 111 | wrist band | | |
| 12 | wearable motion tracking system | 203b | optical imaging device, infrared imaging device |
| 120a, b | first measurement device | 304, 304a, b | further measurement device, orientation capable such as an IMU |
| 121a, b | second measurement device | | |
| 130 | reference unit, head mounted display | | |
| 140 | reference unit | aL | acoustic link |
| 141 | tracked unit | iL | instantaneous link |
| 150 | computing device | oL | optical link |
| 200a | first acoustic communication device | | |

The invention claimed is:

1. A wearable motion tracking system for capturing a relative position between a first body part of a user and a second body part of said user, said wearable motion tracking system comprising:
   at least one first measurement device attachable to said first body part;
   at least one second measurement device attachable to said second body part; and
   a computing device;
   wherein said at least one first measurement device and said at least one second measurement device are configured to perform a plurality of measurements between said first measurement device and said second measurement device so as to obtain measurement data of measurements between the first measurement device and the second measurement device, and
   wherein said computing device is configured such as to obtain by said computing device said plurality of measurements between said first measurement device and said second measurement device, wherein said plurality of measurements between said first measurement device and said second measurement device comprises at least one distance measurement between said first measurement device and said second measurement device; and
   wherein said computing device is configured to compute, in three dimensions, a position of said second measurement device relative to said first measurement device using said plurality of measurements for tracking the position of said second body part relative to said first body part.

2. The wearable motion tracking system according to claim 1, wherein said plurality of measurements between said first measurement device and said second measurement device comprises at least one direction measurement between said first measurement device and said second measurement device.

3. The wearable motion tracking system according to claim 1, wherein said first measurement device comprises a first acoustic communication device and said second measurement device comprises a second acoustic communication device;
   wherein the first and second acoustic communication devices are configured to establish an acoustic link between one another; and
   wherein said plurality of measurements comprises at least one acoustic measurement between said first acoustic communication device and said second acoustic communication device.

4. The wearable motion tracking system according to claim 3, wherein said at least one distance and/or direction measurement is or is comprised in said at least one acoustic measurement.

5. The wearable motion tracking system according to claim 1, wherein said first measurement device comprises a first optical communication device and said second measurement device comprises a second optical communication device;

wherein the first and second optical communication devices are configured to establish an optical link between one another; and wherein said plurality of measurements includes at least one optical measurement between said first optical communication device and said second optical communication device.

6. The wearable motion tracking system according to claim 5, wherein one of said first and second optical communication devices comprises an image sensor and the other of said first and second optical communication devices comprises a trackable feature.

7. The wearable motion tracking system according to claim 6, wherein said trackable feature is a radiation source or wherein a size of the trackable feature is known to and used by the wearable motion tracking system.

8. The wearable motion tracking system according to claim 5, wherein said at least one distance or direction measurement is or is comprised in said at least one optical measurement.

9. The wearable motion tracking system according to claim 8, wherein said distance measurement is an acoustic measurement and said at least one direction measurement is an optical measurement.

10. The wearable motion tracking system according to claim 1, wherein said first measurement device comprises a first ultra-wide band communication device and said second measurement device comprises a second ultra-wide band communication device;

wherein the first and second ultra-wide band communication devices are configured to establish an ultra-wide band link between one another; and wherein said plurality of measurements includes at least one ultra-wide band measurement between said first ultra-wide band communication device and said second ultra-wide band communication device.

11. The wearable motion tracking system according to claim 1, wherein said first body part is a torso or a head of said user or wherein said second body part is an upper limb or a hand of said user.

12. The wearable motion tracking system according to claim 1, wherein said computing device is integrated, at least in part, into a reference unit, the reference unit being attachable to the first body part-of the user and further comprising the at least one first measurement device; and/or wherein said computing device is integrated, at least in part, into a tracked unit, the tracked unit being attachable to the second body part of the user and further comprising the at least one second measurement device.

13. The wearable motion tracking system according to claim 1, wherein said plurality of measurements consists of or comprises one distance and one direction measurement between said first measurement device and said second measurement device or consists of or comprises three or more of said distance measurements.

14. The wearable motion tracking system according to claim 1, wherein said first measurement device or said second measurement device comprise one or more further measurement devices for determining and tracking, at least partially, an orientation of the second measurement device relative to the first measurement device or an absolute orientation of the second measurement device.

15. The wearable motion tracking system according to claim 14, wherein said one or more further measurement devices are inertial measurement units.

16. A method for tracking a relative position between a first body part of a user and a second body part of said user, said method comprising:

using at least one first measurement device attachable said first body part, at least one second measurement device attachable to said second body part and a computing device, and executing an application on said computing device in order i) to perform a plurality of first measurements between said first measurement device and said second measurement device so as to obtain measurement data of measurements between the first measurement device and the second measurement device, wherein said plurality of first measurements between said first measurement device and said second measurement device comprises at least one distance measurement between said first measurement device and said second measurement device; and ii) to compute, in three dimensions, a first position of said second measurement device relative to said first measurement device using said plurality of first measurements;

iii) to perform one or more pluralities of subsequent measurements between said first measurement device and said second measurement device so as to obtain measurement data of measurements between the first measurement device and the second measurement device, wherein said plurality of first measurements between said first measurement device and said second measurement device comprises at least one distance measurement between said first measurement device and said second measurement device; and iv) to compute, in three dimensions, one or more subsequent positions of said second measurement device relative to said first measurement device using said one or more pluralities of subsequent measurements for tracking said position of said second body part relative to said first body part.

17. The method according to claim 16, wherein said plurality of first measurements or said one or more pluralities of subsequent measurements between said first measurement device and said second measurement device comprise at least one direction measurement between said first measurement device and said second measurement device.

18. The method according to claim 16, wherein said plurality of first measurements or said one or more pluralities of subsequent measurements comprise, as said at least one direction measurement, at least one measurement selected from the group consisting of an acoustic measurement, an optical measurement and an ultra-wide band measurement.

19. The method according to claim 16, wherein said plurality of first measurements or said one or more pluralities of subsequent measurements comprise, as said at least one distance measurement, at least one measurement selected from the group consisting of an acoustic measurement, an optical measurement and an ultra-wide band measurement.

20. The method according to claim 16, said plurality of first measurements or said one or more pluralities of subsequent measurements between said first measurement device and said second measurement device consists of one distance and one direction measurement between said first measurement device and said second measurement device.

21. The method according to claim 16, wherein said first body part is a torso or a head of said user or wherein said second body part is an upper limb or a wrist or hand of said user.

22. The method according to claim 16, wherein said tracked position of said second body part relative to said first body part is used in a virtual environment.

23. A wearable motion tracking system for capturing a relative position between a first body part of a user and a second body part of said user, said wearable motion tracking system comprising:
- at least one first measurement device attachable to said first body part;
- at least one second measurement device attachable to said second body part; and
- a computing device;
- wherein said at least one first measurement device and said at least one second measurement device are configured to perform a plurality of measurements between said first measurement device and said second measurement device so as to obtain measurement data of measurements between the first measurement device and the second measurement device, and
- wherein said computing device is configured such as to obtain by said computing device said plurality of measurements between said first measurement device and said second measurement device, wherein said plurality of measurements between said first measurement device and said second measurement device comprises at least one distance measurement between said first measurement device and said second measurement device;
- wherein said computing device is configured to compute, in three dimensions, a position of said second measurement device relative to said first measurement device using said plurality of measurements for tracking the position of said second body part relative to said first body part; and
- wherein said plurality of measurements between said first measurement device and said second measurement device comprises at least one direction measurement between said first measurement device and said second measurement device.

* * * * *